United States Patent
Nakazato

(10) Patent No.: US 12,490,162 B2
(45) Date of Patent: Dec. 2, 2025

(54) NETWORK MANAGEMENT APPARATUS AND NETWORK MANAGEMENT METHOD

(71) Applicant: RAKUTEN MOBILE, INC., Tokyo (JP)

(72) Inventor: Jin Nakazato, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/767,177

(22) PCT Filed: May 25, 2021

(86) PCT No.: PCT/JP2021/019757
§ 371 (c)(1),
(2) Date: Apr. 7, 2022

(87) PCT Pub. No.: WO2022/249273
PCT Pub. Date: Dec. 1, 2022

(65) Prior Publication Data
US 2024/0114410 A1  Apr. 4, 2024

(51) Int. Cl.
*H04W 36/08* (2009.01)
*H04W 36/22* (2009.01)

(52) U.S. Cl.
CPC ........... *H04W 36/08* (2013.01); *H04W 36/22* (2013.01)

(58) Field of Classification Search
CPC .............................. H04W 36/08; H04W 36/22

USPC ........................................................ 370/331
See application file for complete search history.

(56) References Cited

U.S. PATENT DOCUMENTS

| | | | |
|---|---|---|---|
| 2018/0295548 A1* | 10/2018 | Kumar | H04W 36/008375 |
| 2022/0394604 A1* | 12/2022 | Sun | H04W 48/18 |
| 2023/0254914 A1* | 8/2023 | Williams | H04L 41/0895 370/328 |
| 2024/0031930 A1* | 1/2024 | zhu | H04W 60/04 |

FOREIGN PATENT DOCUMENTS

JP     2019-102951 A     6/2019

* cited by examiner

*Primary Examiner* — Faisal Choudhury
(74) *Attorney, Agent, or Firm* — Sughrue Mion, PLLC

(57) ABSTRACT

Disclosed herein is a network management apparatus, comprising: a packet receiving unit configured to receive a packet sent from a user terminal to a core network; an identifier acquisition unit configured to analyze the packet and acquire from the packet a network slice identifier that identifies a network slice used by the user terminal; a base station change determining unit configured to determine whether or not to change a destination base station to which the user terminal is connected from a first base station to a second base station based on the network slice identifier; and a change notifying unit configured to notify the first base station to change the destination base station to which the user terminal is connected from the first base station to the second base station.

13 Claims, 9 Drawing Sheets

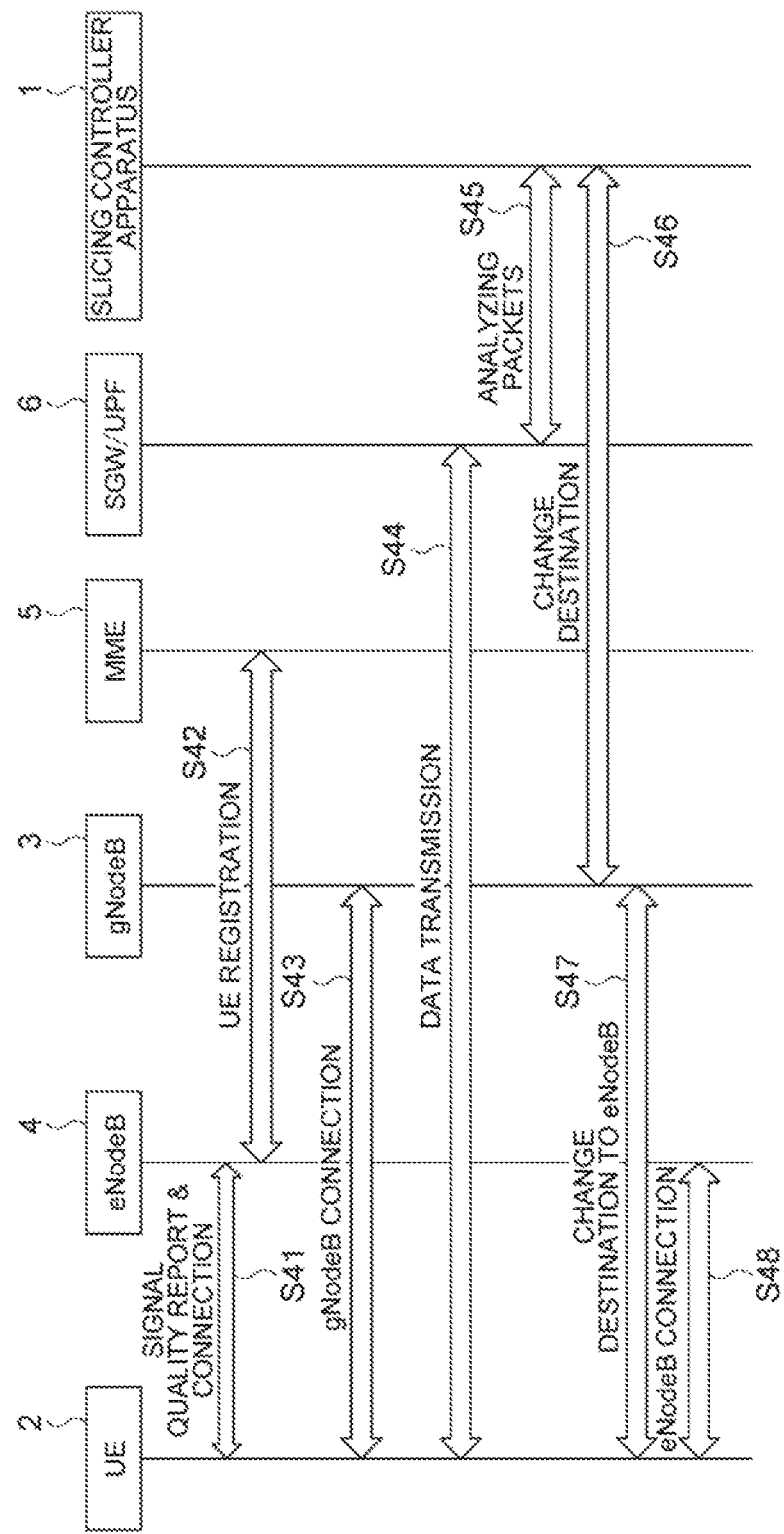

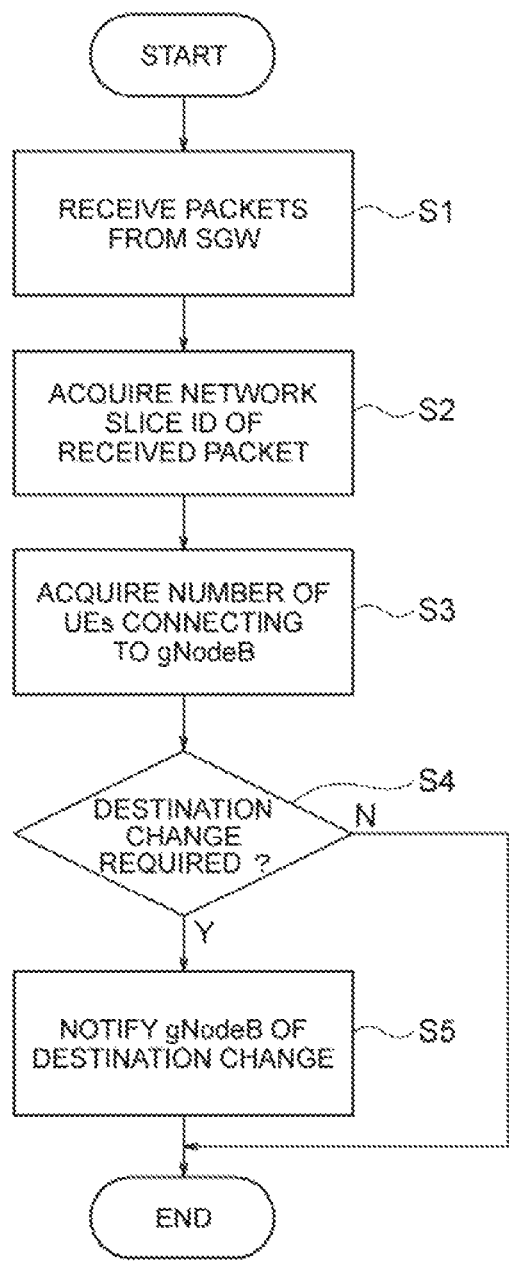

FIG. 6B

| SST Value | Slice/Service Type |
|---|---|
| 1 | eMBB |
| 2 | URLLC |
| 3 | MIoT [Massive IOT] |
| 4 | C-V2X [Cellular Vehicle to Everything] |
| 5 - 127 | Standard (TBD) |
| 128 - 255 | Operator-specific |

NETWORK MANAGEMENT APPARATUS AND NETWORK MANAGEMENT METHOD

CROSS REFERENCE TO RELATED APPLICATIONS

This application is a National Stage of International Application No. PCT/JP2021/019757 filed on May 25, 2021.

TECHNICAL FIELD

The present invention relates to a network management apparatus, a network management method and a program thereof, and more particularly, to a technique for determining a base station to which a user terminal is to be connected.

BACKGROUND ART

The fifth generation mobile communication system (hereinafter referred to as "5G") is an infrastructure that actualizes the enhanced Mobile Broad Band (eMBB) for high-speed and high-capacity communications, the massive Machine Type Communication (mMTC) for ultra-massive terminal connections, and the Ultra-Reliable Low-Latency Communications (URLLC) for ultra-reliable and low-latency communications, and enables a wide variety of use cases.

In particular, the eMBB in 5G allows the throughput above 1 Gbps (bit per second) according to the technical standard, which means that the eMBB is usable for streaming high-resolution images, the Virtual Reality (VR), the Augmented Reality (AR), and other various use cases.

Meanwhile, which base station a User Equipment (hereinafter referred to as "UE") is wirelessly connected to is determined based on the radio field intensity of the radio waves received by the UE from the base station.

For this reason, UEs in the 5G coverage area is to be wirelessly connected to the 5G base station.

Patent Literature 1 (Laid-open Publication of Japanese Patent Application No. 2019-102951 A) discloses a base station selection technique for selecting a base station to which a terminal device is connected from a plurality of base station devices in a wireless communication system using the millimeter wave band.

More particularly, the terminal device disclosed in the Patent Literature 1 measures the radio quality of each beam transmitted from the base station device and calculates the number of connectable beams that satisfy a predetermined radio quality for each base station device. The terminal device also generates a base station selection index for each base station device that indicates the degree of the number of connectable beams to select a base station device to which the terminal device is connected to from among a plurality of base station devices based on the base station selection index. Here, the predetermined radio quality is defined as the threshold of the Received Signal Strength Indicator (RSSI) in which the predetermined throughput or more is obtainable through one beam.

However, assuming that a UE selects a base station to be connected based on the received signal strength, the throughput at the base station is likely to be degraded when there are many UEs within the coverage area of a certain base station.

This is because the physical limit of the throughput, which is defined by Shannon's Theorem on the communication capacity, is shared among the UEs within a single base station area and divided by the number of the UEs.

Here, the base station selection technique disclosed in the Patent Literature 1 selects the base station to be connected at the UE side, regardless of the number of UEs connected to a single base station. For this reason, it is not possible to avoid the throughput degradation when there are many UEs in the coverage area.

Furthermore, while the installation of 5G base stations is expanding, when many users gather in a communication-concentrated area, it raises a growing concern that the throughput, which can be theoretically provided by 5G, may not actually be provided to UEs due to the bottleneck in the number of UEs within the communication-concentrated area.

LISTING OF REFERENCES

Non-Patent Literature

PATENT LITERATURE 1: Laid-open Publication of Japanese Patent Application No. 2019-102951 A

SUMMARY OF THE INVENTION

Problems to be Solved by the Invention

The present invention has been made in order to solve the above mentioned problems and an object thereof is to provide a network management apparatus, a network management method, and a program thereof capable of preventing the throughput in a mobile network from being degraded more effectively so as to improve the communication quality provided to user terminals, regardless of the number of user terminals in a coverage area of a base station.

Solution to Problems

In order to solve the above mentioned problems, according to one aspect of the present invention, there is provided a network management apparatus, comprising: a packet receiving unit configured to receive a packet sent from a user terminal to a core network; an identifier acquisition unit configured to analyze the packet received by the packet receiving unit and acquire from the packet a network slice identifier that identifies a network slice used by the user terminal; a base station change determining unit configured to determine whether or not to change a destination base station to which the user terminal is connected from a first base station to a second base station based on the network slice identifier acquired by the identifier acquisition unit; and a change notifying unit configured to notify the first base station to change the destination base station to which the user terminal is connected from the first base station to the second base station when the base station change determining unit determines that the destination base station to which the user terminal is connected is to be changed from the first base station to the second base station.

The network management apparatus may further comprise: a terminal number acquisition unit configured to acquire from the first base station a number of user terminals connected to the first base station, wherein the base station change determining unit may determine whether or not to change the destination base station to which the user terminal is connected from the first base station to the second base station based on the network slice identifier and the number of user terminals acquired by the terminal number acquisition unit.

The base station change determining unit may compare the number of user terminals acquired by the terminal number acquisition unit with a predetermined threshold, and determine to change the destination base station to which the user terminal is connected from the first base station to the second base station when the number of user terminals exceeds the predetermined threshold.

The base station change determining unit may set a plurality of different thresholds for the number of user terminals depending on a value of the network slice identifier.

The identifier acquisition unit may acquire, as the network slice identifier, a value of an S-NSSAI (Single-Network Slice Selection Assistance Information) described in the packet.

The base station change determining unit may determine, based on a value of an SST (Slice/Service type) of the S-NSSAI, any one of: to change the destination base station to which the user terminal is connected; not to change the destination base station to which the user terminal is connected; and to change the destination base station to which the user terminal is connected when the number of user terminals connected to the first base station exceeds a predetermined threshold.

The network management apparatus may further comprise: a slicing controller unit configured to map transmission of the packet from the user terminal to a network slice that is identified by the network slice identifier acquired by the identifier acquisition unit.

The first base station may be a base station of a fifth generation mobile communication system (5G), and the second base station may be a base station of a fourth generation mobile communication system (4G), and the change notifying unit may notify the first base station of a handover from the first base station to the second base station.

The change notifying unit may notify the first base station of the handover on a C-plane from the first base station to the second base station.

According to another aspect of the present invention, there is provided a base station apparatus, comprising: a radio controller unit configured to wirelessly connect to a user terminal and relay a packet sent from the user terminal to a core network, the packet relayed including a network slice identifier that identifies a network slice used by the user terminal; a receiving unit configured to receive, from a network management apparatus, a notification to change a destination base station to which the user terminal is connected from the base station apparatus to other base station apparatus, the notification being determined based on the network slice identifier; and a transmission unit configured to transmit, to the user terminal, a message to instruct a handover from the base station apparatus to the other base station apparatus based on the notification received by the receiving unit.

The base station apparatus may further comprise: a holding unit configured to hold a number of user terminals connected to the base station apparatus; and a response transmission unit configured to transmit the number of user terminals held by the holding unit to the network management apparatus in response to a request from the network management apparatus.

According to yet another aspect of the present invention, there is provided a network management method performed by a network management apparatus, comprising steps of: receiving a packet sent from a user terminal to a core network; analyzing the received packet and acquiring from the packet a network slice identifier that identifies a network slice used by the user terminal; determining whether or not to change a destination base station to which the user terminal is connected from a first base station to a second base station based on the acquired network slice identifier; and notifying the first base station to change the destination base station to which the user terminal is connected from the first base station to the second base station w % ben it is determined that the destination base station to which the user terminal is connected is to be changed from the first base station to the second base station.

According to yet another aspect of the present invention, there is provided a network management method performed by a base station apparatus, comprising steps of: wirelessly connecting a user terminal and relaying a packet sent from the user terminal to a core network, the packet relayed including a network slice identifier that identifies a network slice used by the user terminal; receiving, from a network management apparatus, a notification to change a destination base station to which the user terminal is connected from the base station apparatus to another base station apparatus, the notification being determined based on the network slice identifier; and transmitting, to the user terminal, a message to instruct a handover from the base station apparatus to the other base station apparatus based on the received notification.

According to yet another aspect of the present invention, there is provided a network management program for causing a computer to execute network management processing, the program causing the computer to execute processing comprising: a packet receiving process for receiving a packet sent from a user terminal to a core network; an identifier acquisition process for analyzing the packet received by the packet receiving process and acquiring from the packet a network slice identifier that identifies a network slice used by the user terminal; a base station change determining process for determining whether or not to change a destination base station to which the user terminal is connected from a first base station to a second base station based on the network slice identifier acquired by the identifier acquisition process; and a change notifying process for notifying the first base station to change the destination base station to which the user terminal is connected from the first base station to the second base station when the base station change determining process determines that the destination base station to which the user terminal is connected is to be changed from the first base station to the second base station.

According to yet another aspect of the present invention, there is provided a network management program for causing a computer to execute network management processing, the program causing the computer to execute processing comprising: a radio controlling process for wirelessly connecting to a user terminal and relaying a packet sent from the user terminal to a core network, the packet relayed including a network slice identifier that identifies a network slice used by the user terminal; a receiving process for receiving, from a network management apparatus, a notification to change a destination base station to which the user terminal is connected from the base station apparatus to other base station apparatus, the notification being determined based on the network slice identifier; and a transmission process for transmitting, to the user terminal, a message to instruct a handover from the base station apparatus to the other base station apparatus based on the notification received by the receiving process.

Advantageous Effect of the Invention

According to the present invention, it makes it possible to prevent the throughput in a mobile network from being degraded more effectively so as to improve the communication quality provided to user terminals, regardless of the number of user terminals in a coverage area of a base station.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 4 is a sequence chart illustrating an exemplary processing sequence of a base station changing processing of the mobile network system according to the present embodiment.

FIG. 5 is a flowchart illustrating an exemplary processing procedure of a base station determination processing performed by the slicing controller apparatus according to the present embodiment.

FIG. 6B is a schematic diagram illustrating a correspondence between values of the S-NSSAI and network slice types.

DESCRIPTION OF EMBODIMENTS

Figure 1:
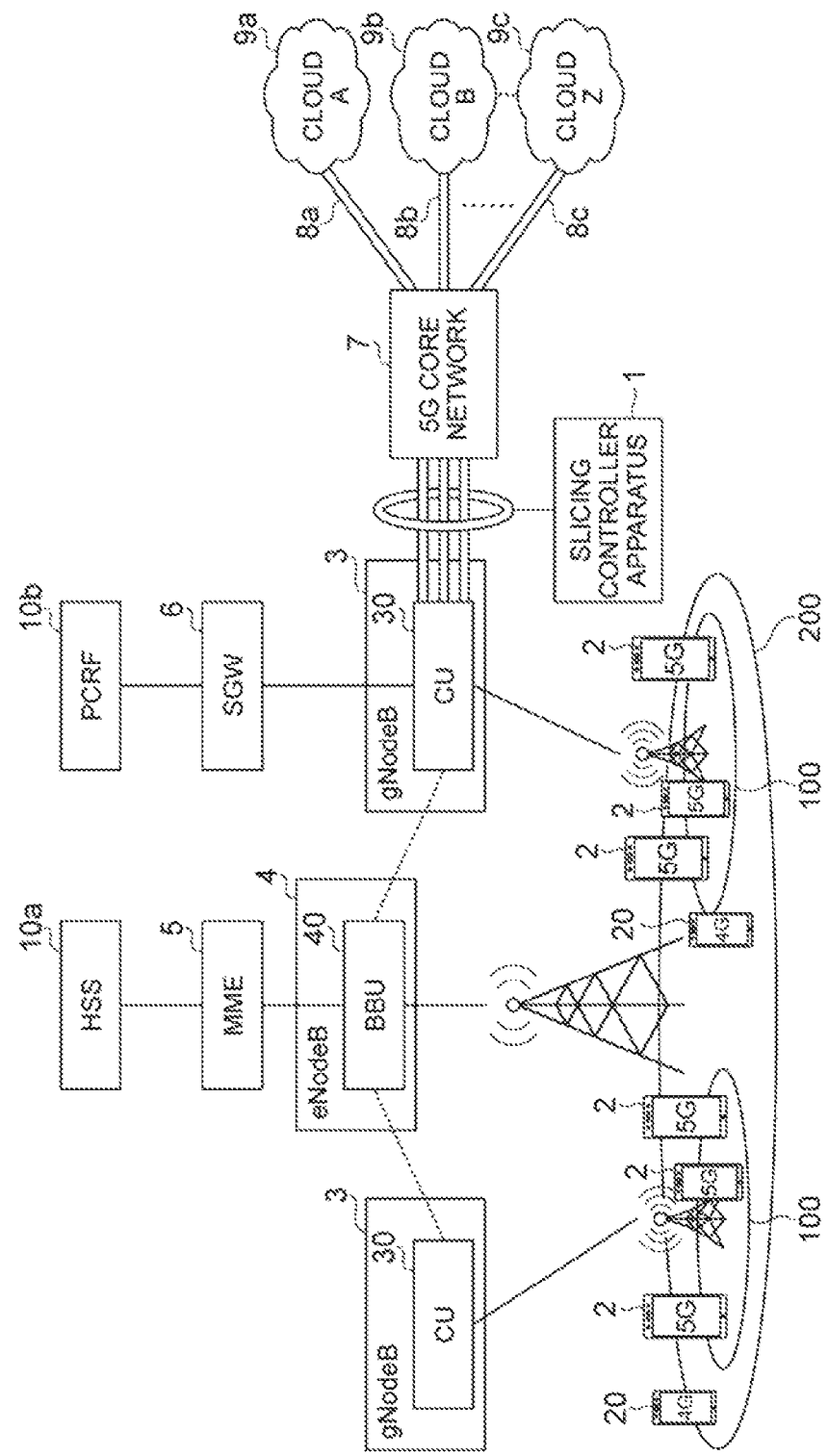
FIG. 1 is a conceptual diagram illustrating an exemplary network configuration of a mobile network system including a slicing controller apparatus according to an embodiment of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a network management apparatus according to the present embodiment is implemented in a slicing controller apparatus that controls the network slicing in the 5G mobile network, analyzes a received packet, acquires a network slice identifier that identifies a network slice from the analyzed packet, and subsequently, based on the acquired network slice identifier, determines whether or not to offload a 5G base station to which a user terminal (hereinafter also referred to as "UE", i.e., user equipment) is connected to a base station of the fourth generation mobile communication system (hereinafter referred to as "4G").

However, the present embodiment is not limited thereto. The network management apparatus according to the present embodiment may be implemented in a server apparatus other than the slicing controller apparatus, which is any of server apparatuses that constitute a backhaul network, which relays a Radio Access Network (RAN) to a core network, or the core network or the like.

Instead of or in addition to the network slice identifier, the network management apparatus may offload from the 5G base station to a 4G base station based on context characteristics of an application executed by a UE. Likewise, the network management apparatus may also offload from a 5G base station to another 5G base station.

<Network Configuration of Mobile Network System>

FIG. 1 is a conceptual diagram illustrating an exemplary network configuration of a mobile network system including a slicing controller apparatus according to the present embodiment.

The mobile network shown in FIG. 1 includes a slicing controller apparatus 1, user terminals (UEs) 2, a 5G base station (hereinafter referred to as "gNodeB") 3, a 4G base station (hereinafter referred to as "eNodeB") 4, a Mobile Management Entity (MME) 5, a Serving GateWay (SGW) 6, and a 5G core network 7. The mobile network may further include a Home Subscriber Server (HSS) 10a, and a Policy and Charging Rules Function (PCRF) 10b. FIG. 1 shows a network in which a 5G mobile network and a 4G mobile network coexist.

Referring to FIG. 1, the slicing controller apparatus 1 connects the RAN, which is a base station network, to the backhaul network, which relays the RAN to the core network, and controls end-to-end network slicing across the RAN, the backhaul network, and the core network.

The network slicing is a network architecture in which a physical network is virtualized depending on required characteristics such as reliability and speed and the like, and network resources such as general-purpose servers and transport devices are divided and assigned to each slice, which is a virtually created logical network, so as to provide end-to-end services according to the intended use.

In FIG. 1, three network slices are shown, that is, a network slice 8a for providing a service 9a of a cloud A, a network slice 8b for providing a service 9b of a cloud B, and a network slice 8c for providing a service 9c of a cloud Z. However, the number of network slices and cloud services is not limited thereto.

The slicing controller apparatus 1 may control the network slicing using is the Software Defined Networking (SDN) or the Network Functions Virtualization (NFV).

In this case, a three-layer architecture may be employed to achieve the network slicing: a physical/virtual resource layer, a virtual network layer, and a service instance layer, starting from the lower layer in this order.

More particularly, in the physical/virtual resource layer, which is the lowermost layer, the physical/virtual resources that constitute the network, such as physical servers and switches, are sliced, as shared resources for the entire network, by the SDN Controller (SDN-C) and the Virtualized Infrastructure Manager (VIM).

In the virtual network layer, which is the upper layer of the physical/virtual resource layer, a set of Network Functions (NFs) are deployed to each of sliced physical/virtual resources by the Virtual Network Function Manager (VNFM) and the NFV Orchestrator (NFVO). The set of network functions deployed on the physical/virtual resources include a communication function, a service application function, and a data transmission protocols and the like necessary for providing services.

In the service instance layer, which is the upper layer of the virtual network layer and the uppermost layer, services to be provided to end users such as the eMBB service and the IoT service are set as service instances, respectively. The Operation Support System (OSS) or the Business Support System (BSS) monitors whether or not the service requirements of each service instance are satisfied.

The network slicing optimizes, for each network slice depending on the required service characteristics, the deployment of respective logical nodes, such as a Radio Unit (RU), which is a wireless equipment in the base station, a virtualized Distributed Unit (vDU), which is a virtualized radio signal processing unit in the base station, a virtualized Central Unit (vCU), which is a virtualized data processing unit in the base station, and a User Plane Function (UPF), which forwards packets of user data (i.e., data packet) and the like, among the physical antenna sites, the local accommodating stations, and the data centers.

For example, in a network slice for ultra-low latency applications such as a remote control application, the vDU, the vCU, and the UPF may be deployed at the antenna site, which is the edge of the mobile network, to reduce the network latency. On the other hand, in a network slice for ultra-high-volume terminal connectivity applications such as IoT, the vCU may be deployed in a central data center to efficiently process large amounts of data from a large number of terminals.

As apparent from the above, the mobile network configuration shown in FIG. 1 does not imply the physical arrangement of respective devices, but rather exemplarily illustrates the configuration of the respective logical nodes of the mobile network.

According to the present embodiment, the slicing controller apparatus 1 implements the network management apparatus of the present embodiment, receives packets sent from the 5G UE 2 via the gNodeB 3 and analyzes the received packets to determine (select) a base station to which the UE 2 is to be connected.

More particularly, the slicing controller apparatus 1 analyzes a data packet sent from the UE 2 via the gNodeB 3 in the uplink transmission, and, based on the network slice identifier described in the data packet, identifies the application context to be used by the UE 2 so as to determine whether or not to offload the UE 2 to the 4G network via the eNodeB 4. The details of this base station determination processing performed by the slicing controller apparatus 1 will be described below with reference to FIG. 4 and FIG. 5.

Referring back to FIG. 1, the user terminal (UE) 2 is a 5G-adaptive device that wirelessly connects to the gNodeB 3 within the coverage area of the gNodeB 3, is capable of the 5G mobile communication via the gNodeB 3 and adapts to the network slicing. The UE 2 also has a 4G-adaptive function that wirelessly connects to the eNodeB 4 within the coverage area of the eNodeB 4, and is capable of the 4G mobile communication via the eNodeB 4.

More particularly, the UE 2 is a device that can be connected to both of the 4G mobile network and the 5G mobile network. When the UE 2 is within a cell 100 of the 5G coverage area, the UE 2 connects to the 5G mobile network via the gNodeB 3, while when the UE 2 is outside the cell 100 of the 5G coverage area but inside a cell 200 of the 4G coverage area, the UE 2 connects to the 4G mobile network via the eNodeB 4, similarly to the UE 20, the 4G-adaptive device. When the UE 2 moves from outside to inside the cell 100 of the 5G coverage area, the handover is performed from the eNodeB 4 to the gNodeB 3 to allow the UE 2 to connect to the 5G mobile network via the gNodeB 3.

A plurality of network slices may be configurable to the UE 2, and applications of the UE 2 may enjoy the desired network characteristics according to the application concerned by specifying any one of the configured plurality of network slices.

It should be noted that the number of UE 2 is not limited to the number shown in FIG. 1. The UE 2 may be any device, such as a smartphone, a cell phone, a tablet, a Personal Computer (PC) or other mobile terminal, a vehicle or other mobile device, or a terminal with built-in devices such as sensors, as long as the UE 2 is capable of 5G mobile communication via the gNodeB 3 and is adaptable to the network slicing.

According to the present embodiment, when the UE 2 receives an instruction message from the gNodeB 3 instructing to perform the handover of a base station to be connected (hereinafter referred to as the "destination base station") from the gNodeB 3 to the eNodeB 4, the UE 2 may perform the handover in accordance with the instruction from the gNodeB 3, even when the UE 2 is located within the cell 100 of the gNodeB 3 coverage area, and operate as a 4G UE 20 after the handover.

The gNodeB 3, which is the 5G base station, transmits and receives radio signals to and from UE 2 via an antenna of the base station. The gNodeB 3 is an edge node that constitutes the RAN of the 5G mobile network. The gNodeB 3 receives an attach request from the UE 2, connects the UE 2 to the 5G core network 7 through the backhaul network, and relays the data transmission between the UE 2 and the services 9a to 9c of desired clouds.

The gNodeB 3 includes a CU 30, which is the data processing unit of the 5G base station. The CU 30 may be a virtualized vCU.

According to the present embodiment, when the gNodeB 3 receives, from the slicing controller apparatus 1, the instruction message to change the destination base station to which the UE 2 is connected from the gNodeB 3 to the eNodeB 4 (hereinafter also referred to as "notification"), the gNodeB 3 sends, to the UE 2, an instruction message to instruct the UE 2 to perform the handover from the gNodeB 3 to the eNodeB 4.

In addition, the gNodeB 3 may hold the number of UEs 2 that are currently connected to the gNodeB 3 in a temporary storage or other memory device and may send the number of UEs to the slicing controller apparatus 1 in response to a request from the slicing controller apparatus 1.

The eNodeB 4, which is the 4G base station, transmits and receives radio signals to and from the UE 2 via an antenna of the base station. The eNodeB 4 is an edge node that constitutes the RAN of the 4G mobile network. The eNodeB 4 receives an attach request from the UE 2 and the UE 20 and connects the UE 2 and the UE 20 to the 4G core network (not shown) through the backhaul network.

The eNodeB 4 includes a BBU 40, which is a baseband processing unit of the 4G base station. The BBU 40 performs signal processing including modulation and demodulation of digital signals.

The gNodeB 3 and the eNodeB 4 are connected via the Xn interface.

It should be noted that when performing the 5G mobile communication, the UE 2 may separate a control plane (i.e., C-plane: CP), which performs control processes such as establishing communication, from a user plane (i.e., U-plane: UP), which performs user data transmission and reception processing so as to use the 5G mobile network and the 4G mobile network concurrently.

In other words, the UE 2 may perform the C-plane function via the BBU 40 (CU-CP) of the eNodeB 4 to establish the 5G mobile communication, and also may transmit and receive packets of user data using the U-plane in the 5G mobile communication, which is established using the C-plane, via the CU 30 (CU-UP) of the gNodeB 3.

Radio waves in the high frequency band used for the 5G mobile communication have propagation characteristics that are highly linear and likely to be blocked by objects. For this reason, as shown in FIG. 1, the coverage area 100 of the gNodeB 3, which is the 5G base station, is smaller than the coverage area 200 of eNodeB 4, which is the 4G base station.

In order to establish the 5G mobile communication and to offload from the 5G base station to the 4G base station by the handover, the UE 2 is configured to perform the C-plane function via the eNodeB 4 instead of the gNodeB 3. As a result, it makes it possible to achieve more stable mobility control in an environment where 4G and 5G mobile networks coexist.

The MME 5, which is a mobility management entity, accommodates the eNodeB 4 and functions as the gateway for control signals from UE 2 and UE 20. The MME 5 performs the mobility management of the UE 2 and the UE 20, authentication (i.e., security control), and setting up the forwarding path to transfer user data between the eNodeB 4 and the SGW 6.

The SGW 6, which is the serving gateway, accommodates the gNodeB 3, functions as the gateway for user data from the UE 2, and controls the packet transmission of user data between the external data network (e.g., the cloud A 9a to the cloud C 9c in FIG. 1) via the core network 7. The SGW 6 serves as a U-plane function (UPF) providing functions specialized for the U-plane processing.

The 5G core network 7 is a high-capacity backbone network that is used by the 5G mobile network as the central role of communications, and connects between line concentrators, hub stations, and operators.

The HSS 10a is a subscriber information database in the 3GPP mobile network that is connected to the MME 5 and performs management of authentication information and presence (in-zone) information.

The PCRF 10b is a node that is connected to the SGW 6 and controls the communication quality. The PCRF 10b controls the Quality of Service (QoS) and billing of the packet transmission of user data. More particularly, the PCRF 10b determines QoS values and billing policies for user data transmission and notifies the SGW 6 of the determined QoS values and billing policies. The SGW 6 performs user data transmission in accordance with the QoS values and billing policies notified from the PCRF 10b.

It should be noted that the MME 5 and the HSS 10a may be nodes in the 4G core network (not shown). Likewise, the SGW 6 and PCRF 10b may be nodes in the 5G core network 7. Alternatively, the SGW 6 may be located at the edge, for example, as a node in the RAN, such as an antenna site or an accommodating station, depending on the network slice.

<Base Station Determination Method of the Present Embodiment>

Hereinafter, the method of determining base station performed by the slicing controller apparatus 1 according to the present embodiment will be generally described.

In a mobile network, which base station the UE 2 connects to wirelessly is determined by the signal strength of the radio waves received by the UE 2 from the base station.

More particularly, when determining the base station to connect to or handover to, the UE 2 measures the reception quality of the radio waves received by the UE 2 from the base station, and sends the measurement result of the reception quality as the Measurement Report (MR) to the base station. The base station may notify the UE 2 of the threshold for sending the MR in advance. In this case, the UE 2 sends the MR to the target base station when the reception quality is measured to be equal to or higher than the notified threshold.

Therefore, referring to FIG. 1, all of the UEs 2 within the cell 100 of the 5G coverage area will be wirelessly connected to the gNodeB 3, which is the 5G base station, even when the UE 2 is redundantly in a cell 200 of the 4G coverage area. In other words, the gNodeB 3 is determined as the destination base station to which all of the UEs 2 shown in FIG. 1 are to be connected.

Meanwhile, the physical limit of the throughput in wireless communication is defined by Shannon's Theorem of communication capacity, with the bandwidth and the signal-to-noise (S/N) ratio as variables.

When a plurality of UEs 2 are present within the coverage area of a given 5G base station (i.e., gNodeB 3), the physical limit of the throughput as defined by Shannon's Theorem of communication capacity is divided by the number of UEs 2 within the coverage area of the gNodeB 3, as shown in Equation 1 below.

$$THP = \frac{B\log(1 + S/N)}{M} \qquad \text{(Equation 1)}$$

In Equation 1 above, B denotes the bandwidth, S denotes the signal level, N denotes the noise level, M denotes the number of UEs 2, and THP denotes the throughput (i.e., theoretical marginal throughput), respectively. As apparent from Equation 1, when a large number of UEs 2 are present in the coverage area of a given 5G base station (i.e., gNodeB 3), the marginal throughput THP of wireless communication that can be provided to each of UEs 2 will decrease in proportion to the number of UEs 2.

According to the present embodiment, the slicing controller apparatus 1 offloads the user data transmission of the UE 2 to the 4G mobile network via the eNodeB 4, which is the 4G base station, based on the context of the application to be used by the UE 2.

More particularly, the slicing controller apparatus 1 analyzes the user data packets transmitted by the UE 2, which has been once connected to the gNodeB 3, on the U-plane, acquires an identifier of the network slice described in the user data packets, and determines whether or not to change the destination base station to which the UE 2 is to be connected based on the acquired network slice identifier.

In this base station determination processing, the slicing controller apparatus 1 may determine whether or not to change the destination base station to which the UE 2 is to be connected only when the number of UEs 2 being connected to the gNodeB 3 exceeds a predetermined threshold.

This means that, depending on the context of the application used by the UE 2, for example, a UE 2 using applications that do not require high speed and high capacity is offloaded to the 4G mobile network, while allowing a UE 2 using applications that require high speed and high capacity to continue using the 5G mobile network so as to guarantee the intended throughput in 5G. As a result, it makes it possible to prevent the throughput in the 5G mobile network from being degraded so as to provide the appropriate communication quality (e.g., quality of service) for each of UEs 2.

<Functional Configuration of Slicing Controller Apparatus>

Figure 2:
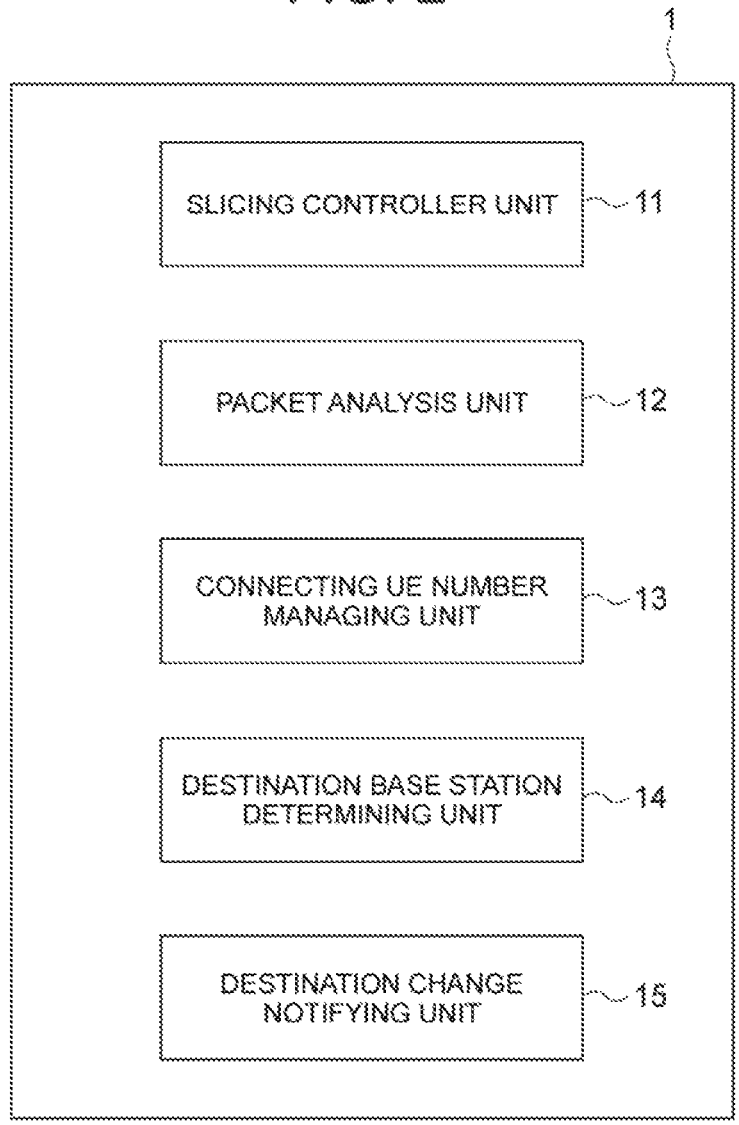
FIG. 2 is a block diagram illustrating an exemplary functional configuration of a slicing controller apparatus according to the present embodiment.

FIG. 2 is a block diagram illustrating an exemplary functional configuration of the slicing controller apparatus 1.

Among the functional modules of the slicing controller apparatus 1 shown in FIG. 2, as for the functions that are implemented by software, those functions may be implemented by storing the program to provide the functions of each functional module in a ROM or other memory, and the allowing a CPU to read the programs into a RAM to execute the programs. As for the functions that are implemented in hardware, for example, a dedicated circuit may be automatically generated on a Field Programmable Gate Array (FPGA) from the programs to provide the function of respective function modules by using a predetermined compiler. Alternatively, it is also possible to form a Gate Array circuit in the same way as an FPGA and implement it by hardware. Yet alternatively, those functions may be implemented an Application Specific Integrated Circuit (ASIC). The configuration of the functional blocks shown in FIG. 2 is no more than an example, and multiple functional blocks may constitute a single functional block, or any of the functional blocks may be divided into blocks that perform multiple functions. The same applies to the functional blocks of the gNodeB shown in FIG. 3.

Referring to FIG. 2, the slicing controller apparatus 1 includes a slicing controller unit 11, a packet analysis unit 12, a connecting UE number managing unit 13, a destination base station determining unit 14, and a destination change notifying unit 15.

The slicing controller unit 11 controls the network slicing across the RAN, the backhaul network, and the core network 7.

More particularly, the slicing controller unit 11 has a Network Slice Selection Function (NSSF) and manages a plurality of network slices each configured according to the context (characteristics) of the application. The slicing controller unit 11 uses the network resources allocated to each network slice to perform end-to-end data communication between the UE 2 and the services 9a to 9c of the respective clouds, to which different network slices 8a to 8c are set, respectively.

The packet analysis unit 12 analyzes the packets of user data transmitted from the UE 2 to the SGW 6 (UPF).

More particularly, the packet analysis unit 12 receives packets of user data transmitted from the UE 2 to the SGW 6 on the U-plane, acquires the network slice identifier described in the received packet, and supplies the network slice identifier to the destination base station determining unit 14.

The packet analysis unit 12 may also acquire information explicitly or implicitly indicating the context (characteristics) of the application other than the network slice identifier from the packets of user data transferred from the UE 2 to the SGW 6 on the U-plane and supply the information to the destination base station determining unit 14. Furthermore, the packet analysis unit 12 may also acquire the control information such as the session management information and communication quality information transmitted from the UE 2 on the C-plane and supply the information to the base station determining unit 14.

The connecting UE number managing unit 13 holds the number of UEs 2 being connected to the gNodeB 3 in a temporary storage device such as a memory, and supplies the number of UEs 2 held to the destination base station determining unit 14 in response to a request from the destination base station determining unit 14.

The connecting UE number managing unit 13 may acquire the number of UEs 2 being connected to each gNodeB 3 by polling each of the gNodeBs 3.

The destination base station determining unit 14 determines a destination base station to which the UE 2 is to be connected based on the network slice identifier or the like supplied by the packet analysis unit 12. In other words, the destination base station determining unit 14 determines whether or not to change the destination base station to which the UE 2 is to be connected from the gNodeB 3 to the eNodeB 4 to offload the UE 2 to the 4G mobile network.

When the destination base station of the UE 2 is determined to be changed to the eNodeB 4, the destination base station determining unit 14 outputs, to the destination change notifying unit 15, an instruction to change the destination base station of the UE 2 from the gNodeB 3 to the eNodeB 4.

The destination base station determining unit 14 may acquire the number of UEs 2 being connected to the gNodeB 3, which is held by the connecting UE number managing unit 13, compare the number of UEs 2 acquired with the predetermined threshold of the number of UEs 2, and when the number of UEs 2 exceeds the predetermined threshold of the number of UEs, instruct the destination change notifying unit 15 to change the destination base station of the UE 2 to the eNodeB 4.

In addition, when the packet analysis unit 12 acquires a predetermined network slice identifier indicating in principle to offload to the 4G mobile network, the destination base station determining unit 14 may further compare the number of UEs being connected to the gNodeB 3, which is held by the connecting UE number managing unit 13, with the predetermined threshold of the number of UEs to determine whether or not to change the destination base station.

When receiving the instruction to change the destination base station of the UE 2 from the gNodeB 3 to the eNodeB 4 from the destination base station determining unit 14, the destination change notifying unit 15 sends, to the gNodeB 3 connecting to the UE 2 concerned, an instruction message (i.e., notification) to change the destination base station of the UE 2 concerned to the eNodeB 4.

The gNodeB 3, which has been instructed to change the destination base station, causes the UE 2 to change the destination base station to the eNodeB 4 via the C-plane by the handover, in order to offload the UE 2 to the 4G mobile network.

<Functional Configuration of gNodeB>

Figure 3:
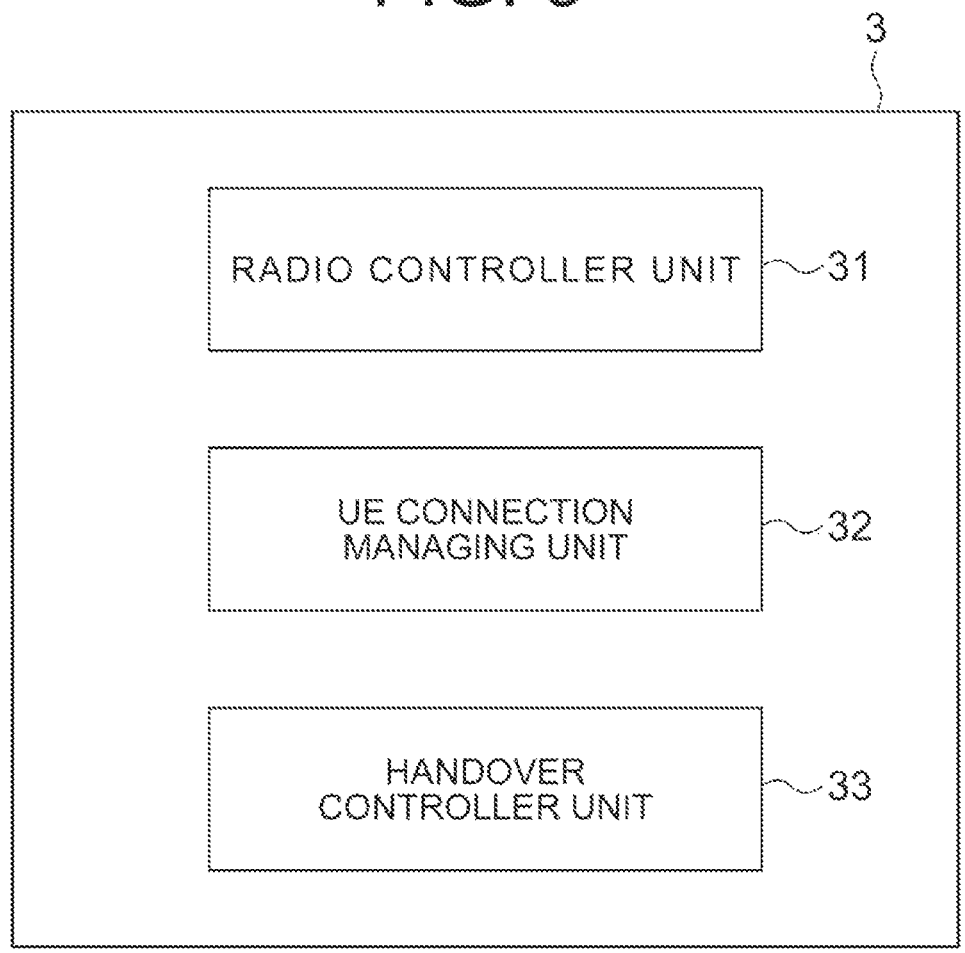
FIG. 3 is a block diagram illustrating an exemplary functional configuration of a 5G base station (gNodeB) according to the present embodiment.

FIG. 3 is a block diagram illustrating an exemplary functional configuration of the 5G base station (i.e., gNodeB 3) according to the present embodiment.

Referring to FIG. 3, the gNodeB 3 includes a radio controller unit 31, a UE connection managing unit 32, and a handover controller unit 33. The gNodeB 3 shown in FIG. 1 is a 5G base station that has functions of a Radio Unit (RU), a radio signal processing unit (i.e., Distributed Unit: DU), and a data processing unit (i.e., Central Unit: CU).

It should be noted that the gNodeB 3 shown in FIG. 1 does not necessarily mean a single physical base station device. The gNodeB 3 may be constituted with one or more slave stations and a master station that accommodates a plurality of slave stations via the fronthaul network in the mobile network shown in FIG. 1.

The 5G slave station has a function of the radio unit (RU) that processes the radio frequency (RF) and transmits and receives radio signals to and from the UE 2.

On the other hand, the 5G master station has functions of the radio signal processing unit (DU) and the data processing unit (CU), and relays control signals and user data transmitted and received to and from the 5G slave stations to the 5G core network 7. It should be noted that the radio signal processing unit (DU) may be deployed in the 5G slave station instead of the 5G master station.

Referring to FIG. 3, the radio controller unit 31 transmits and receives radio signals to and from the UE 2 via the antenna (not shown) of the gNodeB 3.

More particularly, the radio controller unit 31 performs processing required for transmitting and receiving radio signals to and from the UE 2 such as AD/DA conversion of radio signals, beamforming, signal modulation and demodulation, signal encoding and decoding, scrambling, radio resource control, or the like.

The UE connection managing unit 32 manages the number and status of UEs being connected to the gNodeB 3.

More particularly, the UE connection managing unit 32 may acquire information on the session established between the UE 2 and the gNodeB 3, hold the number and status of UEs 2 being connected to the gNodeB 3 in a temporary storage device such as a memory.

The UE connection managing unit 32 may periodically send the number and status of the UEs 2 held to the slicing controller apparatus 1. Alternatively, the UE connection managing unit 32 may respond with the number and status of UEs 2 in response to the polling from the slicing controller apparatus 1.

The handover controller unit 33 sends, to the UE 2, a handover instruction message to change the destination base station of the UE 2 from the gNodeB 3 to the eNodeB 4 based on the instruction message to change the destination base station of the UE 2 sent from the slicing controller apparatus 1. The UE 2, which has received the handover instruction message, performs the handover from the gNodeB 3 to the eNodeB 4 according to the known handover procedure.

<Processing Sequence of Base Station Change Processing>

FIG. 4 is a sequence diagram illustrating an exemplary processing sequence of the base station change processing according to the present embodiment.

In step S41, in order to connect to the 5G core network 7 to use the desired applications of the cloud services 9a to 9c, the UE 2 sends a radio wave quality report (i.e., MR), which indicates the strength of the received radio waves, to the eNodeB 4, and also send a connection request to the eNodeB 4.

In step S42, when the eNodeB 4 receives the connection request from the UE 2 in step S41, the eNodeB 4 sends a message to the MME 5 requesting authentication and registration of the UE 2, which is the source of the connection request.

When the MME 5 receives the request for authentication and registration of the UE 2 sent from the eNodeB 4, the MME 5 authenticates the UE 2 based on the subscriber authentication information notified from the HSS 10a. When the authentication is successful, the MME 5 registers the UE 2 with its location information. The location information of the UE 2 is used to manage the inter-cell mobility of the UE 2.

The processes of steps S41 and S42 are performed by sending and receiving signals on the C-plane. It should be noted that the processes of steps S41 and S42 may be alternatively performed by the gNodeB 3 and Access and Mobility management Function (AMF), instead of the eNodeB 4 and the MME 5.

In step S43, in order to perform transmission of user data with the applications of the desired cloud services 9a to 9c via the 5G core network 7, the UE 2 sends a connection request to the gNodeB 3. The gNodeB 3 then connects to the UE 2, which is the source of the connection request, and relays the user data from the UE 2 to the 5G core network 7.

In step S44, the UE 2, which has connected to the gNodeB 3, performs transmission of user data on the U-plane with the applications of the desired cloud services 9a to 9c via the SGW 6 (UPF) constituting the 5G core network 7 (hereinafter simply referred to as "SGW 6").

In step S45, the slicing controller 1 receives, from the SGW 6, packets transmitted from the UE 2 to the SGW 6 in step S44, and analyzes the received packets of user data.

More particularly, the slicing controller apparatus 1 receives packets of user data forwarded from the UE 2 to the SGW 6 on the U-plane, and acquires the network slice identifier described in the received packets. Subsequently, the slicing controller apparatus 1 determines the context of the application used by the UE 2 based on the acquired network slice identifier so as to determine whether or not to change the destination base station to which the UE 2 is connected to the eNodeB 4 to offload the UE 2 to the 4G mobile network.

Furthermore, the slicing controller apparatus 1 may compare, when determining whether or not to offload the UE 2 to the eNodeB 4, the number of UEs 2 being connected to the gNodeB 3 with the predetermined threshold, and if the number of UEs 2 being currently connected to the gNodeB 3 exceeds the predetermined threshold, the slicing controller apparatus 1 may determine to offload the UE 2 to the eNodeB 4.

It should be noted that the slicing controller apparatus 1 may receive packets of user data forwarded from the UE 2 to the SGW 6 using mirroring.

When the slicing controller apparatus 1 determines to change the base station to which the UE 2 is to be connected from the current gNodeB 3 to the eNodeB 4 in step S45, then in step S46, the slicing controller apparatus 1 sends an instruction message to the gNodeB 3 to change the destination base station of the UE 2 to the eNodeB 4, which is the 4G base station.

In step S47, when the gNodeB 3 receives the instruction message from the slicing controller apparatus 1 to change the destination base station of the UE 2, the gNodeB 3 sends, to the UE 2, an instruction message to perform the handover of the destination base station of the UE 2 from the gNodeB 3 to the eNodeB 4.

In step S48, in accordance with the instruction message to handover received from the gNodeB 3 in step S47, the UE 2 connects to the eNodeB 4 so as to perform the handover.

By performing the processes of steps S45 to S48, subsequently, user data transmission of the UE 2 is offloaded to the 4G mobile network and it makes it possible for the UE 2 to transmit and receive user data to and from the desired applications via the eNodeB 4 and the 4G core network.

<Detailed Processing Procedure of Base Station Determination Processing>

FIG. 5 is a flowchart illustrating an exemplary detailed processing procedure of the base station determination processing performed by the slicing controller apparatus 1. The flowchart in FIG. 5 shows the detailed processing of steps S45 and S46 performed by the slicing controller apparatus 1 shown in FIG. 4.

In step S1, the packet analysis unit 12 of the slicing controller apparatus 1 receives a packet of user data forwarded from the UE 2 to the SGW 6, using mirroring or the like.

In step S2, the packet analysis unit 12 of the slicing controller apparatus 1 refers to the packet of user data received in the step S1, acquires the network slice identifier described in the packet, and supplies the acquired network slice identifier to the destination base station determining unit 14.

In step S3, the destination base station determining unit 14 of the slicing controller apparatus 1 acquires the number of UEs 2 being currently connected to the gNodeB 3 via the connecting UE number managing unit 13.

In step S4, the destination base station determining unit 14 of the slicing controller apparatus 1 determines the context of the application used by the UE 2 based on the network slice identifier acquired in step S2 to determine whether or not to change the destination base station of the UE 2, and supplies the result of determination to the destination change notifying unit 15.

Here, the destination base station determining unit 14 may determine whether or not the UE 2 can be offloaded to the eNodeB 4 by referring to the network slice identifier acquired in step S2 and the number of UEs 2 being connected to the gNodeB 3 acquired in step S3.

More particularly, for example, when the network slice identifier acquired in step S2 indicates a network slice for high speed and high capacity such as the eMBB or a network slice for ultra-reliable and low latency such as the URLLC, the destination base station determining unit 14 may determine not to change the destination base station of the UE 2 to allow the UE2 to continue to connect to the gNodeB 3 unconditionally, regardless of the number of the UEs 2 being connected to the gNodeB 3 acquired in step S3. Also, when the network slice identifier acquired in step S2 indicates a network slice for applications such as IoT, the destination base station determining unit 14 may determine to change the destination base station of the UE 2 to the eNodeB 4 only if the number of UEs 2 being connected to the gNodeB 3 acquired in step S3 exceeds the predetermined threshold, or unconditionally.

The destination base station determining unit 14 may allow the results of the determination to differ according to the sub-categories of the applications of IoT or the like. In this case, for example, when the network slice identifier indicates a network slice for ultra-massive terminal connection such as Massive IoT (MIoT), the destination base station determining unit 14 may determine not to change the destination base station of the UE 2 unconditionally or only if the number of UEs 2 is within a first threshold. On the other hand, when the network slice identifier indicates a network slice for IoT applications other than MIoT, the destination base station determining unit 14 may determine to change the destination base station of the UE 2 unconditionally or only if the number of UEs 2 exceeds a second threshold. Here, the first threshold may be greater than the second threshold, or otherwise may also be equal to or less than the second threshold.

Furthermore, the destination base station determining unit 14 may hold, along with the network slice identifier of the UE 2 acquired in step S2, information on the network slices used by all of the UEs 2 being connected to the gNodeB 3 in a temporary storage device such as a memory. In this case, by reading out the network slice identifiers that are used by the other UEs 2 being connected to the gNodeB 3, which is held in the temporary storage device, the destination base station determining unit 14 may determine whether or not to change the destination base station of the UE 2 concerned in accordance with the contexts of the applications used by the other UEs 2 being connected to the gNodeB 3.

When it is determined in step S4 to change the destination base station of the UE 2 (S4: Y), the processing proceeds to step S5. On the other hand, when it is determined not to change the destination base station of the UE 2 (S4: N), the processing skips step S5 and terminates.

When it is determined in step S4 to change the destination base station of the UE 2, in step S5, the destination change notifying unit 15 sends, to the gNodeB 3, an instruction message to change the destination base station to which the UE 2 is to be connected from the gNodeB 3 to the eNodeB 4.

Figure 6A:
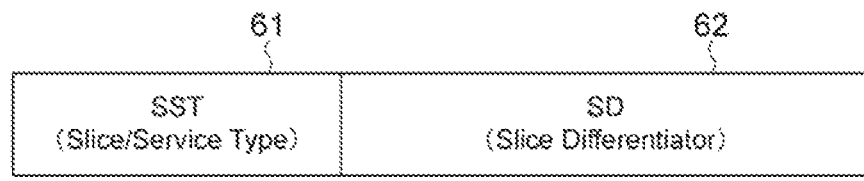
FIG. 6A is a schematic diagram illustrating a format of an S-NSSAI including a network slice identifier.

FIG. 6A is a schematic diagram illustrating a format of a Single-Network Slice Selection Assistance Information (S-NSSAI) including a network slice identifier.

The S-NSSAI shown in FIG. 6A is information that identifies a single network slice, and the UE 2 sets the S-NSSAI in a packet of user data to be transmitted. The packet analysis unit 12 of the slicing controller apparatus 1 acquires the S-NSSAI set in the packet of user data as the identifier of the network slice.

As shown in FIG. 6A, the S-NSSAI includes an SST field 61, and an SD field 62. The Slice/Service Type (SST) field 61 indicates a type of the network slice or the service. The Slice Differentiator (SD) field 62 identifies each of a plurality of network slices when separating into a plurality of network slices within the same SST. The SD field 62 is used to subdivide non-standard slice types, and a value of the SD field 62 defines the detailed slice type when the value of the SD field 62 is not null.

FIG. 6B is a schematic diagram illustrating the correspondence between the values of the SST in the S-NSSAI and the types of network slice.

As shown in FIG. 6B, the S-NSSAI having an SST value of 1 indicates a network slice or service of the eMBB. The S-NSSAI having an SST value of 2 indicates a network slice or service of the URLLC. The S-NSSAI having an SST value of 3 indicates the MIoT (Massive IoT). The S-NSSAI having an SST value of 4 indicates the Cellular Vehicle to Everything (C-V2X), which is an application for connected cars.

SST values from 5 to 127 are reserved for future slice type standardization. The SST values from 128 to 255 are non-standard values and can be defined by operators.

Figure 7:
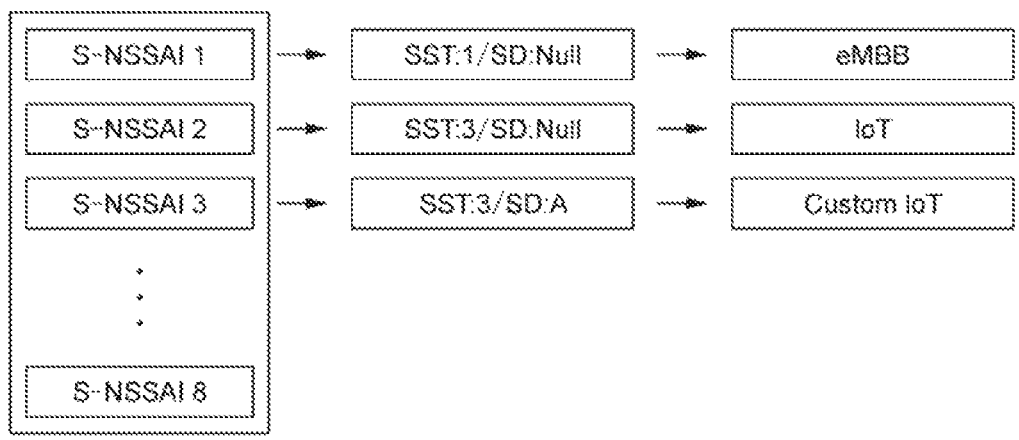
FIG. 7 is a conceptual diagram illustrating an exemplary network slicing using the S-NSSAI and NSSAI.

FIG. 7 is a conceptual diagram illustrating the network slicing using the S-NSSAI and NSSAI. A UE 2 adaptive to the network slicing is capable of using up to eight S-NSSAIs. An NSSAI is a set of a plurality of S-NSSAIs.

The UE 2 is capable of obtaining connectivity to the target network slice through the call flow of the 3GPP C-plane. The UE 2 is mapped to the corresponding transport slice in accordance the SST/SD in each S-NSSAI.

Referring to FIG. 7, an S-NSSAI 1 has an SST value of 1 and is mapped to the network slice for the eMBB. An S-NSSAI 2 has an SST value of 3 and is mapped to the network slice for the IoT. An S-NSSAI 3 has an SST value of 3 and an SD value of A, and is mapped to a network slice for the custom IoT defined by the operator.

In this way, the UE 2 sets the network slice identifier (i.e., SST/SD) in the S-NSSAI depending on the context of the application used by the UE 2. Thus, the UE 2 is capable of using a plurality of network slices differently.

The slicing controller apparatus 1 is capable of easily determining whether or not to offload the UE 2 to the 4G mobile network by referring to the value of the SST/SD in the S-NSSAI set in a packet of user data by the UE 2.

As described above, according to the present embodiment, the slicing controller apparatus analyzes a packet received from the UE, acquires a network slice identifier that identifies a network slice from the analyzed packet, and determines whether or not to handover the 5G base station to which the UE is connected to the 4G base station based on the acquired network slice identifier.

Accordingly, it makes it possible to prevent throughput in the mobile network from being degraded more efficiently regardless of the number of UEs in the coverage area of the base station, thereby improving the communication quality provided to the UEs. As a result, it makes it possible to transmit and receive the necessary amount of data to the respective UEs, and to improve the Quality of Experience (QoE) and the Quality of Service (QoS) in the 5G mobile network.

<Hardware Configuration of Slicing Controller Apparatus>

Figure 8:
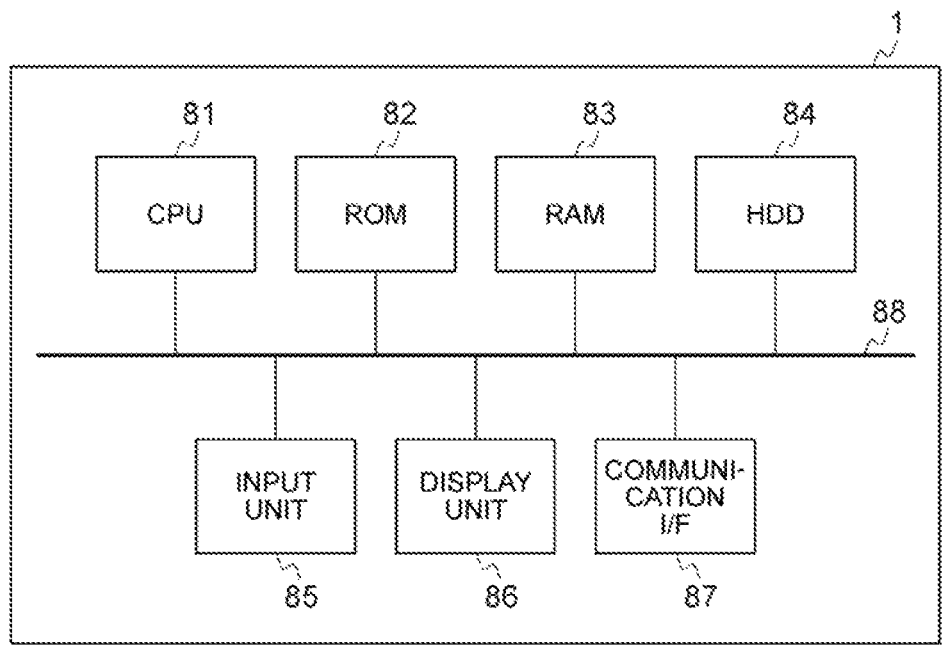
FIG. 8 is a block diagram showing an exemplary hardware configuration of the slicing controller apparatus according to the embodiment of the present invention.

FIG. 8 is a block diagram illustrating a non-limiting example of the hardware configuration of the slicing controller apparatus 1 according to the present embodiment.

The slicing controller apparatus 1 may be implemented in any single or a plurality of computers or any other processing platform. The slicing controller apparatus 1 may be implemented in a general-purpose server device that constitutes a cloud, or otherwise in a dedicated server device.

Referring to FIG. 8, although an example of the slicing controller apparatus 1 being implemented in a single computer is shown, alternatively, the slicing controller apparatus 1 according to the present embodiment may be implemented in a computer system including a plurality of computers. The plurality of computers may be intercommunicatively connected by a wired or wireless network.

As shown in FIG. 8, the slicing controller apparatus 1 may include a CPU 81, a ROM 82, a RAM 83, an HDD 84, an input unit 85, a display unit 86, a communication I/F 87, and a system bus 88. The slicing controller apparatus 1 may also be equipped with an external memory.

The CPU (Central Processing Unit) 81 controls entire operations of the slicing controller apparatus 1 in a comprehensive manner, and controls the operations of respective components 82 to 87 via the system bus 88, which serves as a data transmission path.

The ROM (Read Only Memory) 82 is a non-volatile memory that stores the control programs and the like necessary for the CPU 81 to execute the processing.

Those programs may be stored in a non-volatile memory such as an HDD (Hard Disk Drive) 114, an SSD (Solid State Drive), or removable storage media (not shown).

The RAM (Random Access Memory) 83 is a volatile memory and functions as a main memory, a work area, or the like of the CPU 81. In other words, the CPU 81 loads the necessary programs and the like from the ROM 82 into the RAM 83 and executes the programs to realize various functional operations.

The HDD 84 stores, for example, various data and information necessary for the CPU 81 to perform processing using the programs. In addition, the HDD 84 stores, for example, various data and various information and the like obtained by the CPU 81 performing the processing using the programs and the like.

The input unit 85 is constituted with a pointing device such as a keyboard or a mouse.

The display unit 86 is constituted with a monitor such as a liquid crystal display (LCD). The display unit 86 may provide a GUI (Graphical User Interface) that is used to input instructions to the slicing controller apparatus 1 for various parameters used in the base station determination processing, communication parameters used in communication with other devices, or the like.

The communication I/F 87 is an interface that controls communication between the slicing controller apparatus 1 and external devices.

The functions of at least some of the components of the slicing controller apparatus 1 shown in FIG. 1 may be realized by the CPU 81 executing the programs. However, at least some of the functions of the components of the slicing controller apparatus 1 shown in FIG. 1 may be operated by a dedicated hardware. In this case, the dedicated hardware operates based on the control of the CPU 81.

Although certain embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

REFERENCE SIGNS LIST

1: Slicing Controller Apparatus; 2: UE; 3: gNodeB; 4: eNodeB: 5: MME; 6: SGW; 7: 5G Core Network: 8a to 8c: Network Slices: 9a to 9c: Cloud Services; 10a: HSS: 10b: PCRF; 11: Slicing Controller Unit: 12: Packet Analysis Unit: 13: Connecting UE Number Managing Unit; 14: Destination Base Station Determining Unit; 15: Destination Change Notifying Unit; 30: CU, 31: Radio Controller Unit; 32: UE Connection Managing Unit; 33: Handover Controller Unit: 40: BBU; 81: CPU; 82: ROM, 83: RAM, 84: HDD; 85: Input Unit; 86: Display Unit; 87: Communication I/F; 88: System Bus

What is claimed is:

1. A network management apparatus, comprising:
at least one memory configured to store program code; and
electric circuitry including at least one of a field programmable gate array (FPGA), an application specific integrated circuit (ASIC), and at least one processor, the at least one processor being configured to read and operate according to the program code, the electronic circuitry configured to:

receive a packet sent from a user terminal to a core network on a user plane associated with a network slice used by the user terminal;

analyze the packet and acquire from the packet, as a network slice identifier that identifies the network slice used by the user terminal, a value of an S-NSSAI (Single-Network Slice Selection Assistance Information) described in the packet;

determine to change, based on a value of an SST (Slice/Service Type) of the S-NSSAI, a destination base station to which the user terminal is connected from a first base station to a second base station when the number of user terminals connected to the first base station exceeds a predetermined threshold; and notify the first base station to change the destination base station to which the user terminal is connected from the first base station to the second base station based on determining that the destination base station to which the user terminal is connected is to be changed from the first base station to the second base station.

2. The network management apparatus according to claim 1, the electronic circuitry further configured to:

acquire from the first base station a number of user terminals connected to the first base station, wherein determining the base station change determines whether or not to change the destination base station to which the user terminal is connected from the first base station to the second base station based on the network slice identifier and the number of user terminals.

3. The network management apparatus according to claim 2, wherein determining the base station change compares the number of user terminals with a predetermined threshold, and determines to change the destination base station to which the user terminal is connected from the first base station to the second base station when the number of user terminals exceeds the predetermined threshold.

4. The network management apparatus according to claim 3, wherein determining the base station change sets a plurality of different thresholds for the number of user terminals depending on a value of the network slice identifier.

5. The network management apparatus according to claim 1, the electric circuitry further configured to:

map transmission of the packet from the user terminal to a network slice that is identified by the network slice identifier.

6. The network management apparatus according to claim 1, wherein the first base station is a base station of a fifth generation mobile communication system (5G), and the second base station is a base station of a fourth generation mobile communication system (4G), and notifying the change notifies the first base station of a handover from the first base station to the second base station.

7. The network management apparatus according to claim 6, wherein notifying the change notifies the first base station of the handover on a C-plane from the first base station to the second base station.

8. A base station apparatus, comprising:

at least one memory configured to store program code; and electric circuitry including at least one of a field programmable gate array (FPGA), an application specific integrated circuit (ASIC), and at least one processor, the at least one processor being configured to read and operate according to the program code, the electronic circuitry configured to:

wirelessly connect to a user terminal and relay a packet sent from the user terminal to a core network on a user plane associated with a network slice used by the user terminal, the packet relayed including, as a network slice identifier that identifies the network slice used by the user terminal, a value of an S-NSSAI (Single-Network Slice Selection Assistance Information) described in the packet;

receive, from a network management apparatus, a notification to change a destination base station to which the user terminal is connected from the base station apparatus to another base station apparatus when the number of user terminals connected to the base station exceeds a predetermined threshold, the notification being determined based on a value of an SST (Slice/Service Type) of the S-NSSAI; and transmit, to the user terminal, a message to instruct a handover from the base station apparatus to the other base station apparatus based on the notification.

9. The base station apparatus according to claim 8, the electric circuitry further configured to:

hold a number of user terminals connected to the base station apparatus; and transmit the number of user terminals to the network management apparatus in response to a request from the network management apparatus.

10. A network management method performed by a network management apparatus, comprising steps of:

receiving a packet sent from a user terminal to a core network on a user plane associated with a network slice used by the user terminal;

analyzing the received packet and acquiring from the packet, as a network slice identifier that identifies the network slice used by the user terminal, a value of an S-NSSAI (Single-Network Slice Selection Assistance Information) described in the packet;

determining to change, based on a value of an SST (Slice/Service Type) of the S-NSSAI, a destination base station to which the user terminal is connected from a first base station to a second base station when the number of user terminals connected to the first base station exceeds a predetermined threshold; and notifying the first base station to change the destination base station to which the user terminal is connected from the first base station to the second base station based on determining that the destination base station to which the user terminal is connected is to be changed from the first base station to the second base station.

11. A network management method performed by a base station apparatus, comprising steps of:

wirelessly connecting a user terminal and relaying a packet sent from the user terminal to a core network on a user plane associated with a network slice used by the user terminal, the packet relayed including, as a network slice identifier that identifies the network slice used by the user terminal, a value of an S-NSSAI (Single-Network Slice Selection Assistance Information) described in the packet;

receiving, from a network management apparatus, a notification to change a destination base station to which the user terminal is connected from the base station apparatus to other another base station apparatus when the number of user terminals connected to the base station exceeds a predetermined threshold, the notification being determined based on a value of an SST (Slice/Service Type) of the S-NSSAI; and transmitting, to the user terminal, a message to instruct a handover from the base station apparatus to the other base station apparatus based on the received notification.

12. A non-transitory computer readable medium having instructions stored therein, which when executed by a processor cause the process to execute network management processing comprising:
- a packet receiving process for receiving a packet sent from a user terminal to a core network on a user plane associated with a network slice used by the user terminal;
- an identifier acquisition process for analyzing the packet received by the packet receiving process and acquiring from the packet, as a network slice identifier that identifies the network slice used by the user terminal, a value of an S-NSSAI (Single-Network Slice Selection Assistance Information) described in the packet;
- a base station change determining process for determining whether-of-not-to change, based on a value of an SST (Slice/Service Type) of the S-NSSAI, a destination base station to which the user terminal is connected from a first base station to a second base station when the number of user terminals connected to the first base station exceeds a predetermined threshold; and
- a change notifying process for notifying the first base station to change the destination base station to which the user terminal is connected from the first base station to the second base station based on the base station change determining process determining that the destination base station to which the user terminal is connected is to be changed from the first base station to the second base station.

13. A non-transitory computer readable medium having instructions stored therein, which when executed by a processor cause the process to execute network management processing comprising:
- a radio controlling process for wirelessly connecting to a user terminal and relaying a packet sent from the user terminal to a core network on a user plane associated with a network slice used by the user terminal, the packet relayed including, as a network slice identifier that identifies the network slice used by the user terminal, a value of an S-NSSAI (Single-Network Slice Selection Assistance Information) described in the packet;
- a receiving process for receiving, from a network management apparatus, a notification to change a destination base station to which the user terminal is connected from the base station apparatus to another base station apparatus when the number of user terminals connected to the base station exceeds a predetermined threshold, the notification being determined based on a value of an SST (Slice/Service Type) of the S-NSSAI; and
- a transmission process for transmitting, to the user terminal, a message to instruct a handover from the base station apparatus to the other base station apparatus based on the notification received by the receiving process.

* * * * *